(12) United States Patent
Wilt et al.

(10) Patent No.: US 11,226,349 B2
(45) Date of Patent: Jan. 18, 2022

(54) AUTOMATED MONOCHROMATOR SAMPLE FEEDING MECHANISM

(71) Applicant: The Innovative Technologies Group & Co., Ltd, Jessup, MD (US)

(72) Inventors: Robert R. Wilt, Chestertown, MD (US); Luigi Faustini, Burtonsville, MD (US)

( * ) Notice: Subject to any disclaimer, the term of this patent is extended or adjusted under 35 U.S.C. 154(b) by 268 days.

(21) Appl. No.: 16/081,519

(22) PCT Filed: Mar. 2, 2017

(86) PCT No.: PCT/US2017/020448
§ 371 (c)(1),
(2) Date: Aug. 31, 2018

(87) PCT Pub. No.: WO2017/151920
PCT Pub. Date: Sep. 8, 2017

(65) Prior Publication Data
US 2019/0064195 A1    Feb. 28, 2019

Related U.S. Application Data

(60) Provisional application No. 62/302,430, filed on Mar. 2, 2016.

(51) Int. Cl.
*G01N 35/04*   (2006.01)
*G01N 35/00*   (2006.01)
(Continued)

(52) U.S. Cl.
CPC ....... *G01N 35/04* (2013.01); *G01N 35/00732* (2013.01); *G01N 35/02* (2013.01);
(Continued)

(58) Field of Classification Search
CPC .. G01N 35/04; G01N 35/00732; G01N 35/02; G01N 2035/0441; G01N 2035/04449
(Continued)

(56) References Cited

U.S. PATENT DOCUMENTS 2,100,227 A * 11/1937 Stoate ................. H01J 40/14
209/524
3,491,511 A * 1/1970 Nigrelli .................. B65B 21/24
156/539

(Continued)

FOREIGN PATENT DOCUMENTS

| EP | 0898171 | 2/1999 |
|---|---|---|
| EP | 0502638 | 5/2000 |
| JP | WO2014/002955 | 1/2014 |

*Primary Examiner* — Alexander A Mercado
*Assistant Examiner* — Monica S Young
(74) *Attorney, Agent, or Firm* — Royal W. Craig; Gordon Feinblatt LLC (57) ABSTRACT

A feeding system (2) for feeding disc-shaped objects such as sample cups (4) to an analyzer. The system (2) includes as infeed trade (22) angled downward from horizontal and the outfeed track (24) angled downward, plus a reject chute. The disc feeding system (2) uses two RFID readers/writers, one (32) a standalone desktop and a second (190) proximate the sample bay of the analyzer for more comprehensive track-and-trace capability. The information read from the cup (4) tag as it is scanned is also stored with the resultant spectra so that predictive processing is applied properly and without error. For post scan (after the sample scan is completed) the scan information itself may be written directly to the sample cup RFID tag including, reflection/transmission, characteristics, constituent results etc.

18 Claims, 8 Drawing Sheets

(51) Int. Cl.
*G01N 35/02* (2006.01)
*G01N 21/13* (2006.01)

(52) U.S. Cl.
CPC .......... *G01N 35/025* (2013.01); *G01N 21/13* (2013.01); *G01N 2035/0439* (2013.01); *G01N 2035/0441* (2013.01); *G01N 2035/0449* (2013.01)

(58) Field of Classification Search
USPC ........................................................ 73/864
See application file for complete search history.

(56) References Cited

U.S. PATENT DOCUMENTS

| | | | | |
|---|---|---|---|---|
| 4,651,879 | A * | 3/1987 | Harris | B07C 5/126 198/803.7 |
| 4,724,035 | A * | 2/1988 | Mann | B29C 65/7858 156/423 |
| 5,087,423 | A | 2/1992 | Ishibashi | |
| 5,171,979 | A * | 12/1992 | Kwa | G01N 35/04 250/223 B |
| 5,374,395 | A * | 12/1994 | Robinson | G01N 21/253 422/562 |
| 5,441,701 | A * | 8/1995 | Marsoner | G01N 33/4925 422/63 |
| 5,560,888 | A * | 10/1996 | Seto | G01N 35/00029 422/105 |
| 5,575,978 | A * | 11/1996 | Clark | B01F 11/0022 206/563 |
| 6,162,998 | A * | 12/2000 | Wurst | G01G 17/00 177/145 |
| 6,478,162 | B1 * | 11/2002 | Yamamoto | B07C 5/16 209/593 |
| 8,266,874 | B2 * | 9/2012 | Runft | G01G 17/00 53/432 |
| 9,694,447 | B1 * | 7/2017 | Hughes | B23K 26/1405 |
| 2001/0019826 | A1 * | 9/2001 | Ammann | B03C 1/282 435/6.11 |
| 2002/0056669 | A1 | 5/2002 | Pratt | |
| 2004/0197927 | A1 * | 10/2004 | Jeng | G01N 21/05 436/171 |
| 2005/0244972 | A1 | 11/2005 | Hilson | |
| 2006/0204997 | A1 * | 9/2006 | Macioszek | G01N 35/0099 435/6.11 |
| 2008/0156377 | A1 * | 7/2008 | Mann | B09B 3/0058 137/263 |
| 2009/0208626 | A1 * | 8/2009 | Jarrard | A23N 15/003 426/518 |
| 2010/0200306 | A1 * | 8/2010 | Trebbi | G01G 17/00 177/1 |
| 2010/0254854 | A1 * | 10/2010 | Rich | G01N 21/78 422/64 |
| 2011/0108470 | A1 * | 5/2011 | Wang | A61J 3/074 209/592 |
| 2011/0125314 | A1 * | 5/2011 | Robinson | C12Q 1/02 700/228 |
| 2011/1125314 | | 5/2011 | Robinson | |
| 2011/0259468 | A1 * | 10/2011 | Bedetti | A61J 3/074 141/1 |
| 2013/0206484 | A1 * | 8/2013 | Consoli | G01G 13/026 177/1 |
| 2015/0064802 | A1 | 3/2015 | Pollack et al. | |
| 2016/0012305 | A1 * | 1/2016 | Cocquelin | B07C 5/10 382/199 |
| 2017/0254827 | A1 * | 9/2017 | Walker | G01N 35/04 |
| 2020/0174031 | A1 * | 6/2020 | Fujii | B01L 9/06 |

* cited by examiner

AUTOMATED MONOCHROMATOR SAMPLE FEEDING MECHANISM

CROSS-REFERENCE TO RELATED APPLICATION(S)

The present application derives priority from U.S. Provisional Patent Application 62/302,430 filed 2 Mar. 2016.

BACKGROUND OF THE INVENTION

1. Field of the Invention

The present invention relates generally to feeder mechanisms for disc-shaped objects and, more particularly, to a feeder/conveyor mechanism for optical sampling cups.

2. Description of the Background

Many agricultural and food production operations rely on spectroscopic analysis to test materials with radiated energy, and there are many different variations of spectroscopic analyzers on the market today. Near-infrared (NIR) spectroscopy has greatly simplified and improved the speed of analysis for quality testing of grains, flours and beans. The use of near-infrared spectroscopy has led to higher sample throughput by replacing multiple time-consuming and complicated chemical techniques. Using NIR spectroscopy it is possible to non-destructively analyze inhomogeneous samples for moisture, protein, oil and many other parameters in less than one minute at all stages of production: grading, milling, oil extraction and final product quality verification. In most large scale operations such as grain processing, representative samples of the product are tested at predetermined intervals. Commercial grain analyzers suitable for this purpose in grain production operations are commercially-available. Of these, some grain analyzers are transmission-mode analyzers that test the whole grain. Others are reflectance-mode analyzers that typically test ground grain (though reflectance-mode analyzers at also suitable for some whole grains, flour, feeds, forages etc.). Reflectance-mode grain analyzers and many other analyzers use "sample cups" to contain the test sample. An amount of grain is deposited into a disc-shaped sample cup which has one or more windows, and measurements of radiation transmitted through or reflected through the grain via the window(s) is analyzed. Traditional grain analysis systems require an operator to monitor the process line and to manually remove representative samples of grain from the process line for testing.

Figure 1:
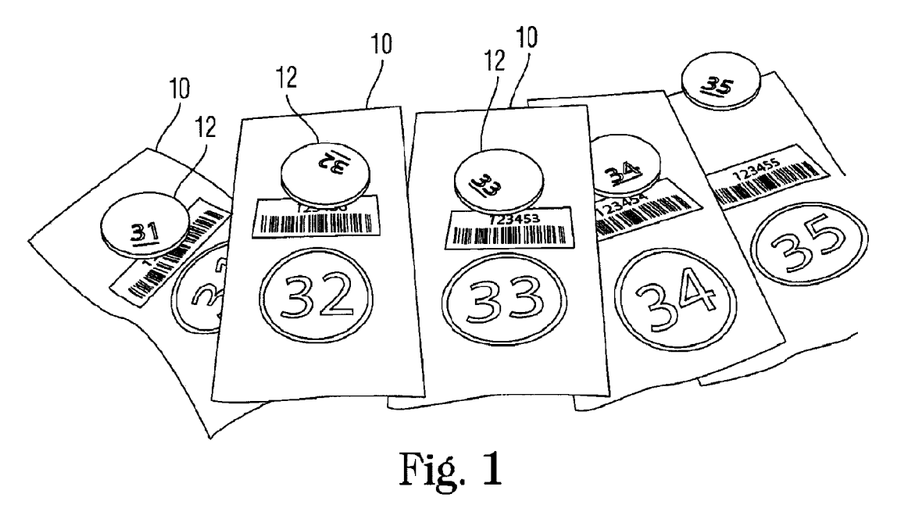
FIG. 1 is a front perspective view of a plurality of various grain samples in individual marked envelopes 10, with corresponding marked adhesive labels 12 for attachment to sample cups prior to loading.

FIG. 1 is a front perspective view of a plurality of various (feed/forage) grain samples in individual marked envelopes 10, with corresponding marked adhesive labels 12 for attachment to sample cups prior to loading. The marking shown in FIG. 1 is currently done by bagging the various grain samples in individual envelopes, marking the envelopes, filling individual sample cups with (product/grain from the envelopes, and marking the sample cups in accordance with the envelopes, all by hand. The process is tedious and error-prone. The sample cups are then hand fed into a grain analyzer one-by-one. The entire process suffers from the additional manpower needed to select, organize and catalogue representative samples, transport them to the grain analyzer and monitor the progress of grain analysis before manually returning the sample container and/or the sample to the product line to repeat the process. Few attempts have been made to automate the process.

U.S. Pat. No. 5,087,423 to Ishibashi issued Feb. 11, 1992 shows a modular analyzer in which sample cups are automatically transported and distributed via conveyer belts. Unfortunately, when it comes to auto-feeding disc-shaped objects into a precise position at finely-timed intervals, conveyer belts do not provide the measure of control necessary.

In addition, the accuracy of the conventional process of analyzing samples from a production line comprising grain or other agricultural or non-agricultural goods also suffers with greater variability in intervals between samples as they are taken from the production line. Ideally, for the best sample accuracy, a sample is removed from the process line and transferred immediately to a grain analyzer or other sampling device without delay, so that testing occurs as soon as passible after the sample is removed from the line. With grain, with other types of agricultural goods and other selected products, defects occur in a non-random fashion due to differences in the way that batches of crops are grown, harvested, stored, etc. When samples from the production line are tested as soon as possible after being removed from the line, any samples that do not meet quality control standards may be noted as soon as possible and the batch(es) corresponding to same may be removed from production or otherwise corrected earlier in the process.

Accordingly, what is needed is a feeder/conveyor for sample cups that allows a human operator to fill a plurality of sample cups with materials to be analyzed, easily label the sample cups with a machine-readable label, load those sample cups into a queue on the feeder/conveyor, the feeder/conveyor thereupon automating the infeed and outfeed of the queued sample cups into an analyzer on an as-needed basis so that samples are tested as soon as possible after being removed from the line, then ejected from the analyzer back onto a return queue on the feeder/conveyor for prompt disposition.

SUMMARY OF THE INVENTION

Accordingly, it is an object of the present invention to provide an improved feeder for disc-shaped objects such as sample cups that employs inclined infeed and return tracks for efficiently and automatically forming infeed and outfeed queues, the infeed and return tracks converging on a rotating carousel for transporting multiple disc elements such as sampling cups to the infeed of a grain analyzer for on-demand-processing.

It is another object of the invention to provide an improved feeder/conveyor that automatically queues and transports multiple disc elements along an infeed track and a return track for testing at the analyzer.

It is also an object of the present invention to provide such an improved disc feeding system with dual RFID readers/writers, one desktop and the other proximate the sample bay of the analyzer so that it can communicate with the sample the cup while it is in the scanning position, the combination giving a more comprehensive track-and-trace capability.

These and other features and benefits are achieved with an improved disc feeding system for disc-shaped objects such as sample cups and the like with both an infeed track for queuing a plurality of disc-shaped objects, and an outfeed track. The infeed track is angled downward from horizontal and the outfeed track is angled downward from horizontal opposite the infeed track, such that the infeed track and outfeed track converge toward a point. In addition, a reject chute drops disc-shaped objects directly downward. The infeed track, outfeed track and reject chute converge to a servo-drive carousel that is rotatable about a point, the servo-drive carousel comprising a disc defined by a plurality of U-shaped notches for receiving disc-shaped objects. There is a switchable gate proximate an end of the infeed track for gating disc-shaped objects into the carousel. The disc feeding system uses two RFID readers/writers, one standalone desktop and a second proximate the sample bay of the analyzer for more comprehensive track-and-trace capability. The desktop RFID reader/writer allows technicians to tag each sample cup with a label with a unique sample number, type and other known information after the samples have been prepared in the lab, prior to its scan. A second RFID reader/writer is mounted proximate the carousel. The RFID read/write head (including coil) is attached remotely from the electronics on a pusher bar that is actually touching the sample cup while it is in the scan position to read and write to the RFID tags while at the instrument. The pusher bar pushes the sample cups and/or calibration tiles into position relative to the scanning plane, thereby keeping them accurately positioned. Mounting a second RFID reader/writer with head directly an the pusher bar gives an accurate pre-scan read and an accurate post-scan write because the reader/writer head is actually touching the sample cup while it is in the scan position. For pre-scan, the sample cup is placed in the feed carousel and the initially-stored data is transferred to the second RFID reader/writer and verified, thereby eliminating the risk of erroneous scan errors and ensuring sample traceability. The information read from the cup tag as it is scanned is also stored with the resultant spectra so that predictive processing is applied properly and without error. For post scan (after the sample scan is completed) the scan information itself may be written directly to the sample cup RFID tag including reflection/transmission characteristics, constituent results etc. The information read from the cup tag in conjunction with the spectra and coordinated prediction of constituent values along with other information may be used at this point to eject the sample cup.

BRIEF DESCRIPTION OF THE DRAWINGS

Other objects, features, and advantages of the present invention will become more apparent from the following detailed description of the preferred embodiment and certain modifications thereof, in which.

DETAILED DESCRIPTION OF THE PREFERRED EMBODIMENTS

Figure 2:
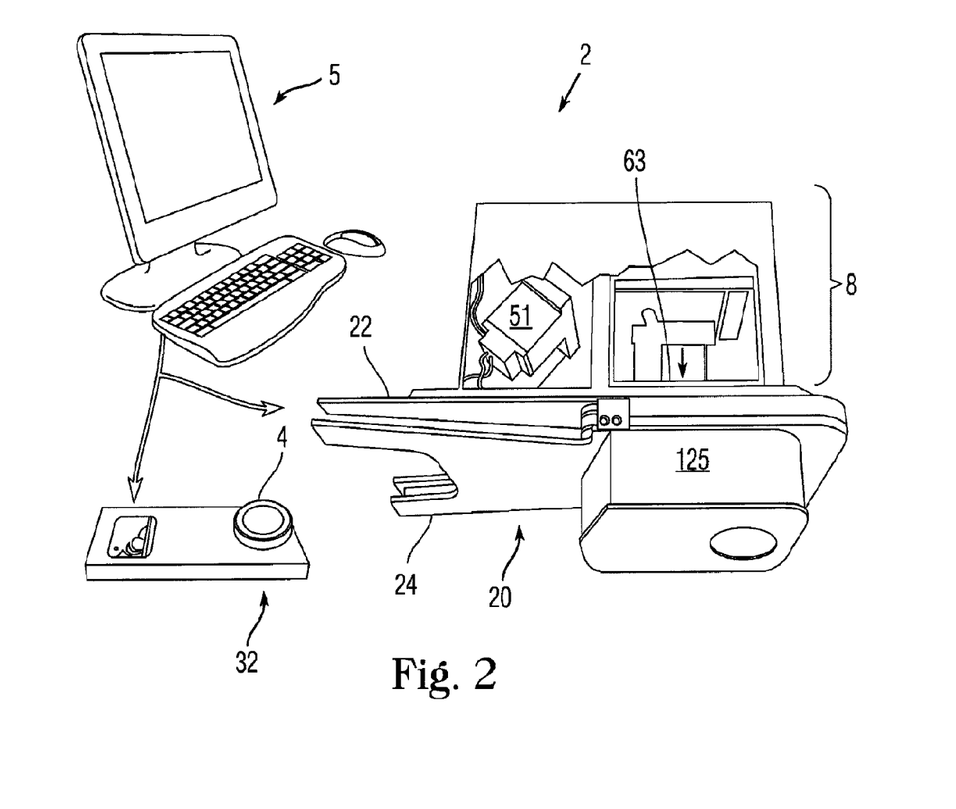
FIG. 2 is a perspective view of an embodiment of the improved disc feeder/conveyor system 2 according to the present invention.

FIG. 2 is a perspective view of an embodiment of the improved disc feeder conveyor system 2 according to the present invention. The disc feeder conveyor system 2 is herein configured to feed and eject sample cups to/from a conventional scanning monochromator 8 of a type which generally includes an optical bench having a light source assembly 51, entrance optics, a slit/shutter assembly, and exit optics (not shown). In general operation of scanning monochromator 8 the light source assembly 51 emits a broad spectrum of radiation which is collected by the entrance optics, and projected onto a diffraction grating then through the exit slit/shutter assembly. The diffraction grating disperses light by diffracting different wavelengths at different angles, and a selected spectral component of the light emanates out through an exit aperture 63.

The present invention includes a sample cup infeed/outfeed queuing mechanism 20 configured for attachment to the scanning monochromator 8 such that the selected spectral component of the light emanating out through an exit aperture 63 passes directly into the sample cup infeed/outfeed queuing mechanism 20 of the present invention. The sample cup infeed/outfeed queuing mechanism 20 automatically loads one sample cup 4 from a multi-cup infeed track 22 onto an internal carousel (obscured) which is rotatably controlled to position the sample cup 4 at a prescribed distance from exit aperture 63. The selected spectral component of the light emanating out through exit aperture 63 is refracted off the sample in sample cup 4, back to a detector/detection system in monochromator 8 which measures the intensity of the diffusely reflected light from the sample, converting the light power to an electrical signal by which a quantitative analysis of any of it variety of characteristics of a sample, including constituent analysis, moisture content, taste, texture, viscosity, etc. The high degree of automation and mechanical technique (pusher bar for example) ensures consistent sample presentation, more efficient sample pick-up and scanning, and more accurate scanning, as a consequence.

In addition to the sample cup infeed/outfeed queuing mechanism 20, the disc feeder/conveyor system 2 incudes a desktop RFID writer/reader 32 external to the lit sample cup infeed/outfeed queuing mechanism 20, plus an internal RFID writer/reader (not shown . . . to be described) internal to the sample cup infeed/outfeed queuing mechanism 20. The desktop RFID writer/reader 32 has a dock for indexing a sample cup 4 thereon during reading/writing, and a central controller 5.

The controller 5 includes a programmable controller and non-transitory storage memory housing the system control software that is programmed to detect and decode the RFID tags, and to synchronize operation of the disc feeder/conveyor system 2. The controller 5 may be any conventional computing device with display and user-input device, and may be the existing controller provided with the scanning monochromator 8.

The controller 5 software provides a graphical user interface to guide a user through the following steps: (1) collecting a sample to be tested and cataloging the specimen; (2) analyzing the specimen; and (3) reviewing and recording the test results; and (4) track-and-trace of each specimen. Collecting and cataloging a sample broadly includes goring batch and sample information (i.e. information related to the customer, product type calibration that is to be used for predictive analysis etc.) in a collection facility database accessible by the controller 5 and assigning a unique indicia to each sample, filling a sample cup 4, labeling the sample cup 4 with a machine scannable label bearing the indicia, as well as information such as which calibration equation to use for predictive analysis once the sample is scanned, and loading the sample cup 4 into the infeed track 22 and administering the test. One skilled in the art will readily understand that different users may prefer to store different data on the machine scannable label. Typically, the laboratory technician will want to write a bar code related to their customer(s) and a product code which may be used to direct the prediction engine to the appropriate calibration equation. Optionally, that calibration equation or any other information as desired may be stored on the scannable label. Preferably, the machine scannable label is a radio frequency identification (RFID) tag, and toward that end the desktop RFID reader/writer 32 is connected by USB (Universal-Serial-Bus) connector to Controller 5. The RFID reader/writer 32 includes a rectangular housing with a flattop platform defined by a slightly-recessed circular receptacle to index position of a sample cup 4 aced thereupon (as shown). Internally, the RFID reader/writer 32 includes a circuit board having a processor and a USB controller, and an antenna board stacked on the circuit board. The antenna board includes a toroidal antenna directly beneath the circle-receptacle for reading/writing an RFID code to an adhesive label as seen in FIG. 1. This way, as each sample cup is filled and logged the controller 5 assigns a unique indicia alone with product and processing information and guides the user to label the sample cup 4 by adhering an RFID label, writing the label with the assigned indicia using the RFID reader/writer 32, then loading the sample cup 4 into the infeed track 22 and administering the scan.

Figure 3:
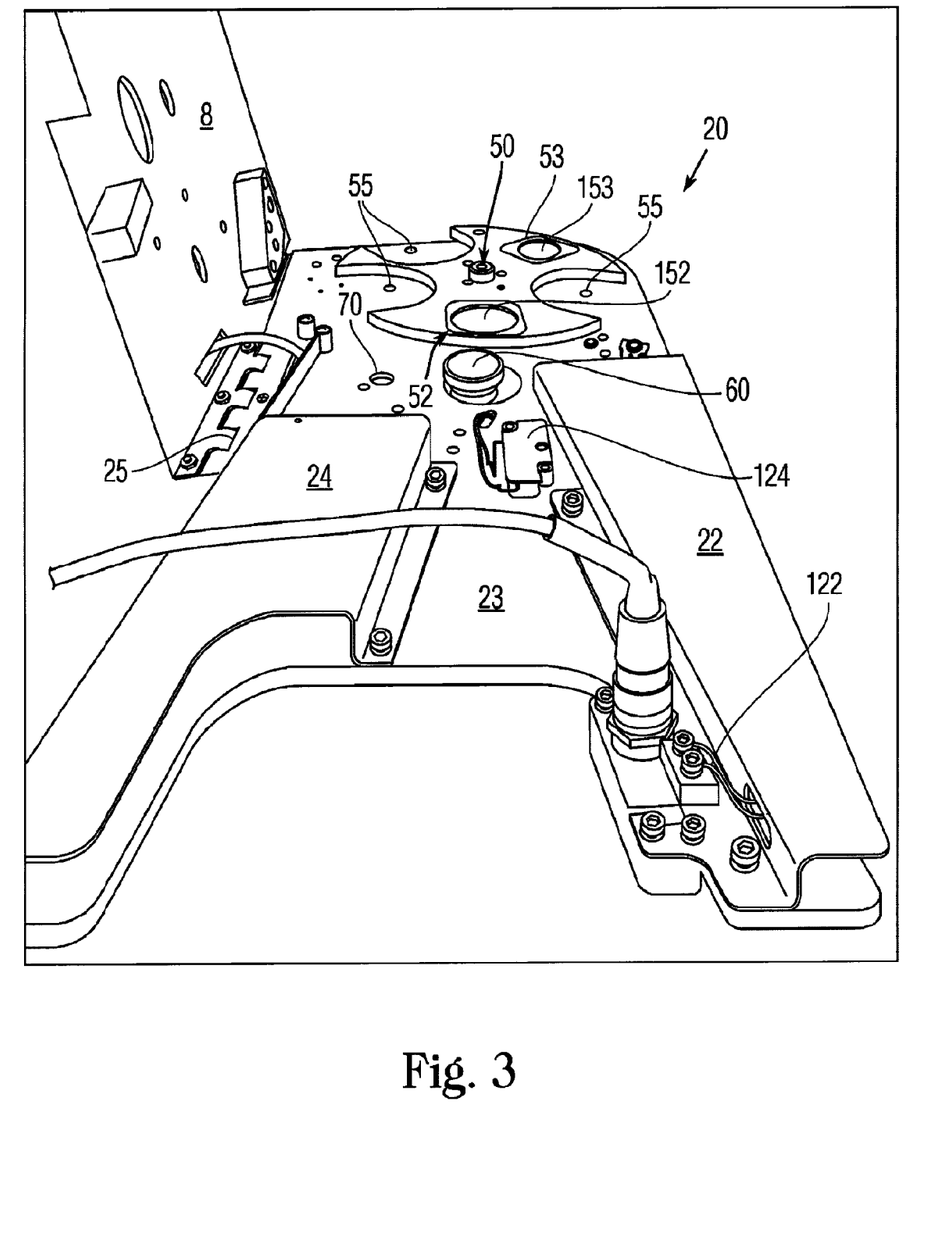
FIG. 3 is a side perspective illustration of the open-hinged disc feeder/conveyor mechanism 20 of the present invention.

FIG. 3 is a side perspective illustration of the open-hinged disc feeder/conveyor mechanism 20 of the present invention. The disc feeder/conveyor mechanism 20 attaches to the face of the scanning monochromator 8 on lower-hinges to allow it to swing open downward for easy access. The disc feeder/conveyor mechanism 20 is constructed with a flat plate 23 that is cut to define the in feed and oinked tracks 22, 24, and plate 23 is mounted on hinges 25 to the monochromator 8. Tracks are screwed to the inside of plate 23 to define the ramped infeed and outfeed tracks 22, 24, and the motor drive and electronics are mounted on the opposite side of plate 23 and fully enclosed in a cover 125 as seen in FIG. 2.

Figure 4:
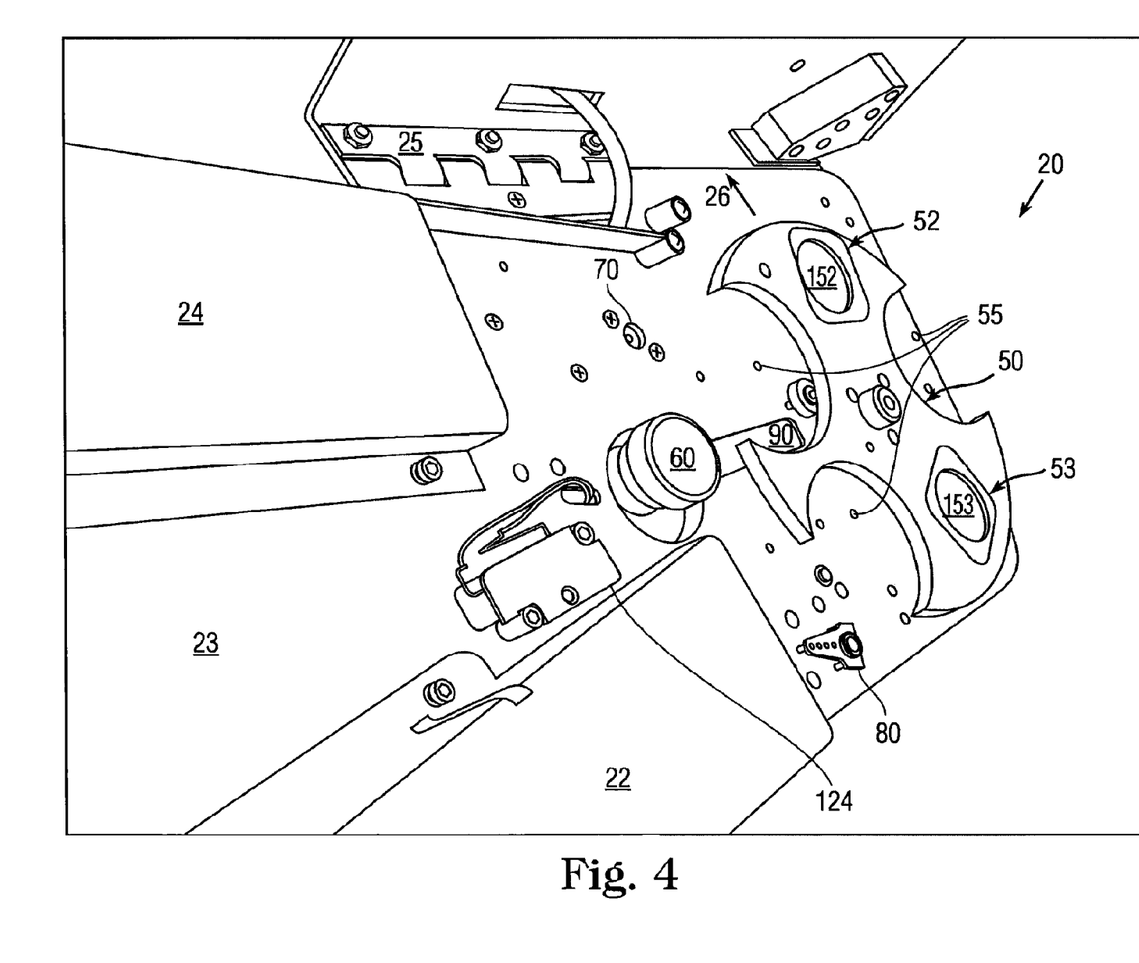
FIG. 4 is a close-up side perspective illustration of the open-hinged disc feeder/conveyor mechanism 20 as in FIG. 3 showing the cup carousel 50.

FIG. 4 is a close-up of the cup carousel 50. A predetermined number (e.g., five) sample cups 4 may be RFID-tagged and loaded onto the infeed track 22 at a given time. The infeed track 22 generally comprises a downwardly inclined open-topped chute equipped with a first sample cup sensor 122 at its upper end (see FIG. 3) and a second sample cup sensor 124 at its lower end. The illustrated sensors 122, 124 are microswitches but one skilled in the art will understand that sensors 122, 124 may be Reed switches, paddle switches, proximity switches or other suitable switches, or hall-effect (magnetic) or photo-optic sensors. Sample cups 4 residing in the chute 22 are detected by the first and second sensors 122, 124, indicating to the controller 5 (e.g., indicating that there is a sample cup to load and/or that the unit is/is not full . . . this configuration indicates whether there are 0 cups, 1 cup or 5 cups).

Thus, if the first microswitch 122 is depressed the infeed track 22 is full, and if the second microswitch 124 is not depressed the infeed track 22 is empty. Loading may be automated (from as conveyor) or manual in which case the user is prompted to add specimen/sample caps accordingly. One skilled in the art will understand that sample cups 4 may by automatically loaded onto the disc feeder/conveyor 2 by some external hopper assembly (not shown), which may or may not be under common control of controller 5 (the information from sensor 122 is used to decide whether or not to load another cup 4 into the upper infeed track 22). A servo-controlled gate 80 is provided at the mouth of infeed track 22 to selectively admit sample cups 4 into the carousel 20 by rotating out of the way.

Similarly, the outfeed track 24 generally comprises a downwardly open-topped chute, optionally equipped with microswitches at its upper and/or lower ends. Operation is similar for the outfeed track 24, where off-loading may be manual or automated.

In addition to the infeed track 22 and outfeed track 24, the present device includes an ejection chute 26 for discarding sample cups 4 that present anomalous scan results. The ejection chute 26 leads directly downward.

Figure 5:
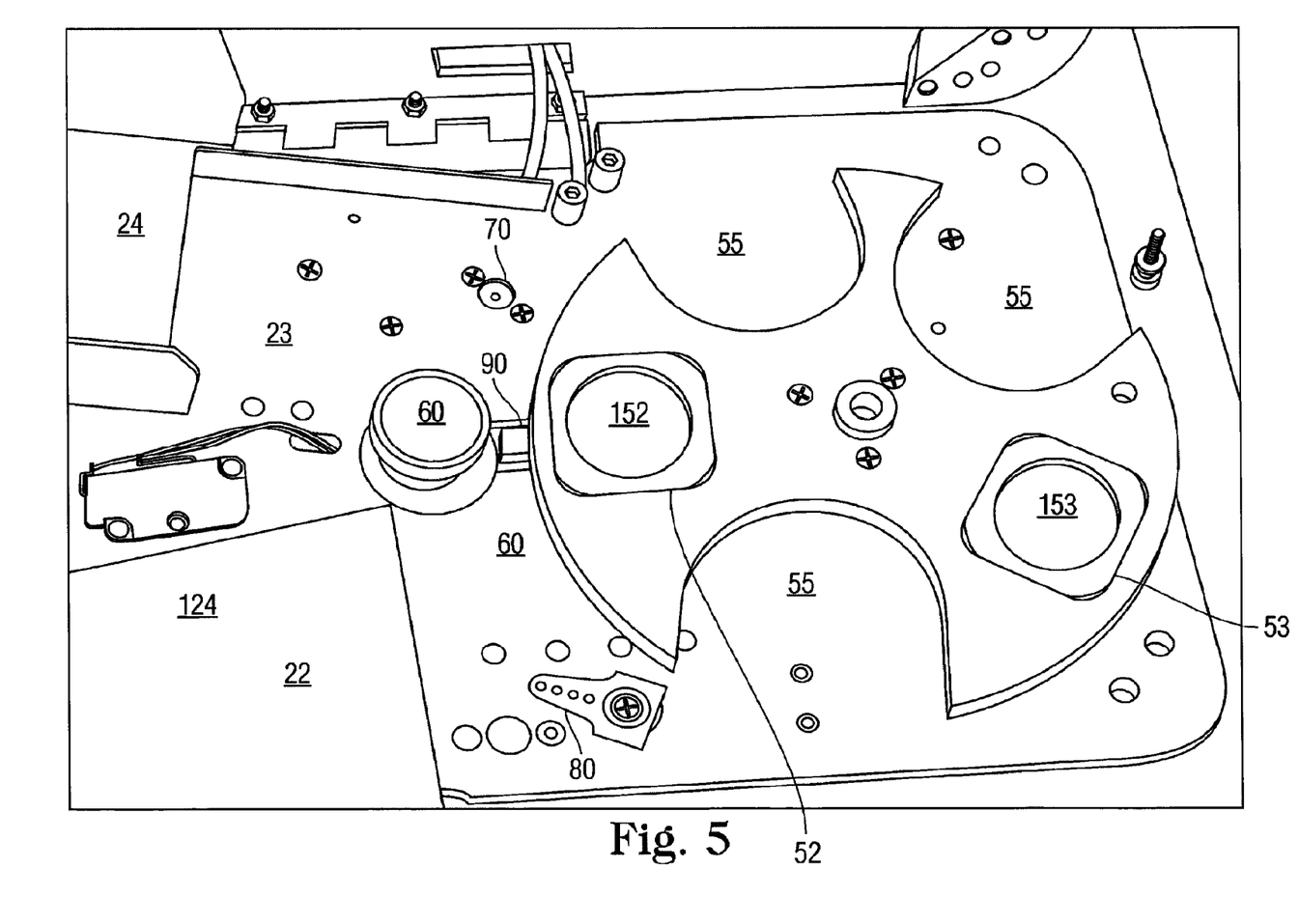
FIG. 5 is a close-up side perspective illustration of the cup carousel 50 of FIG. 4 (with a reference/baseline reflector 152 in place).

As seen in FIG. 5, the infeed and outfeed tracks 22, 24, as well as ejection chute 26 converge to/from servo-controlled carouse 150. The carousel 50 is formed with three semi-circular recesses separated by three leaves. Floating calibration standards 52, 53 are carried within of the three leaves. The floating calibration standards both comprise calibrated reference materials i.e. reflectance standards or wavelength/absorbance standards 152, 153 carried within a rectangular frame as shown, and slidable within a conforming window in the carousel 50. When measuring reflectance it is necessary to zero the instrument using light reflected from a stable reflectance tile/material which is generally fairly inactive in wavelength species, e.g., ceramic or spectralon). One standard 52 with tile 152 serves this purpose, while the other standard 53 and tile 153 is a wavelength alignment and/or check tool which could also be used to check for optical abnormalities including wavelength alignment, absorbance linearity, optical noise etc. It is then necessary to perform a mathematical correction based on these standards. All this is automated in the present invention. One skilled in the art should readily understand that additional calibration standards may be used is desired, each likewise slidable within a conforming window in the carousel 50.

In use of the carousel 20, a sample cup 4 is queued into the carousel 50 from infeed track 22 by turning the carousel 50 until the sample cup 4 falls into a U-shaped recess 55 defined between flanking leaves of the carousel 50 (three recesses 55 total, though carousel 50 may be scaled in diameter to accommodate more or fewer recesses 55 and number of leaves to store more sample cups 4 without departing from the scope and spirit of the invention). The radius of curvature at the trough of each U-shaped recess 55 is on the order of approximately 1 inch, just larger than the sample cup 4. A sample cup need not be in the carousel 50 it is placing and scanning the reference and or references 152, 153. The carousel 50 is rotated to position the standards 152, 153 for scanning and completes two calibration scans using calibration standards 152, 153, then it loads and positions the sample cup 4 directly in front of the monochromator reflection aperture (see FIG. 2). The scan is completed.

Figure 6:
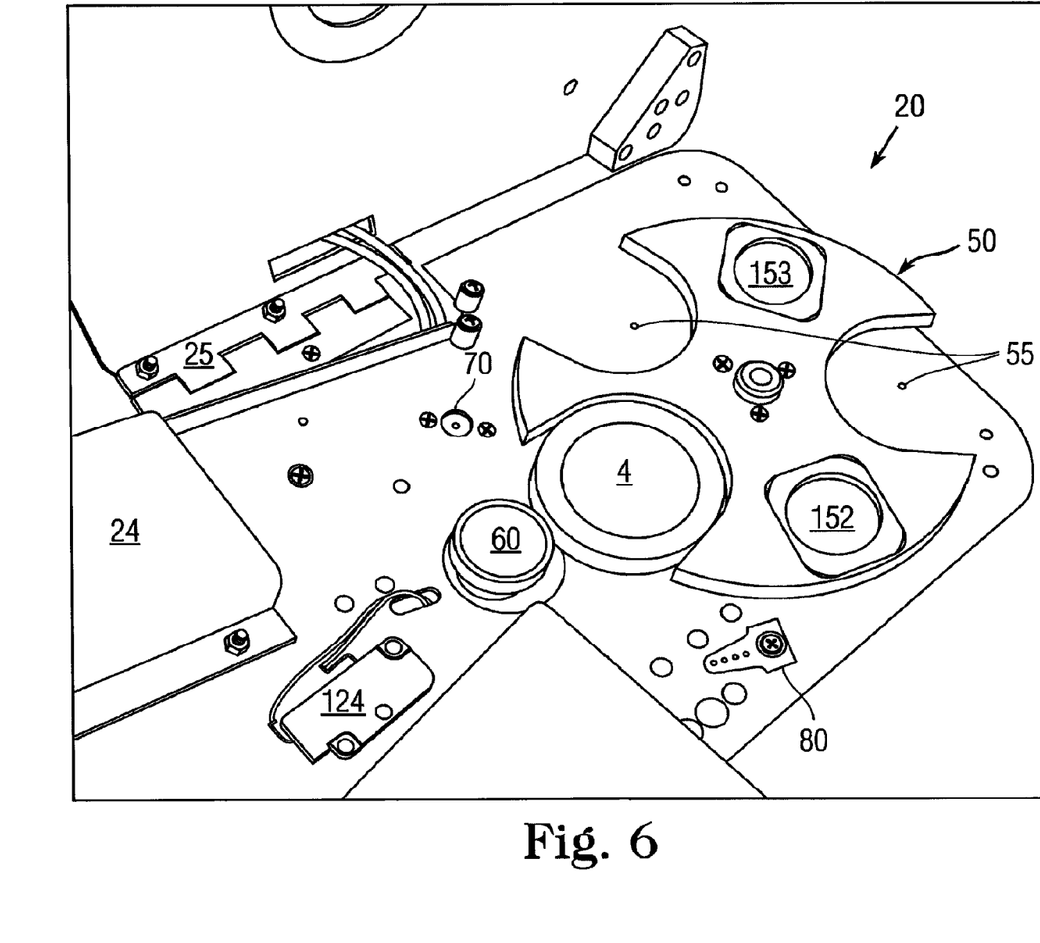
FIG. 6 is a close-up side perspective illustration of the cup carousel 50 of FIGS. 4-5 with loaded sample cup 4.

Referring back to FIG. 5, in addition to the servo-controlled carousel 50, a servo-controlled spinner/indexing wheel 60 is offset from carousel 50. Spinner indexing wheel 60 comprises a rotary wheel with rubber lip spaced at about a 1" offset from carousel 20. Spinner/indexing wheel 60 serves two purposes. First, as seen in FIG. 6, it rotates each sample cup 4 while still in the scan position to allow taking of multiple scans at various orientations. The totaling sample cup 4 helps to eliminate problems associated with sample non-homogeneity. The sample cup 4 rotation is controlled by controller 5, and may be user-programmed, for example, for ten scans taken at 36° intervals and averaged for each wavelength. Spinner/indexing wheel 60 also operates in conjunction with a detent post 70 to selectively direct sample cups 4 into the outfeed track 24 or ejection chute 26. Detent post 70 is solenoid driven, journaled into plate 23, and also operates under computer control or on-board control. Detent post 70 is energized to protrude slightly from the plate 23, or is deenergized to sit flush with plate 23. When not energized and when carousel 50 is rotated downward or clockwise from FIG. 6, spinner/indexing wheel 60 along with gravity assists to unload the cup from the carousel 50 and push it into the outfeed track 24. When energized, detent post 70 protrudes and allows sample cups 4 to pass into the ejection chute 26.

Figure 7:
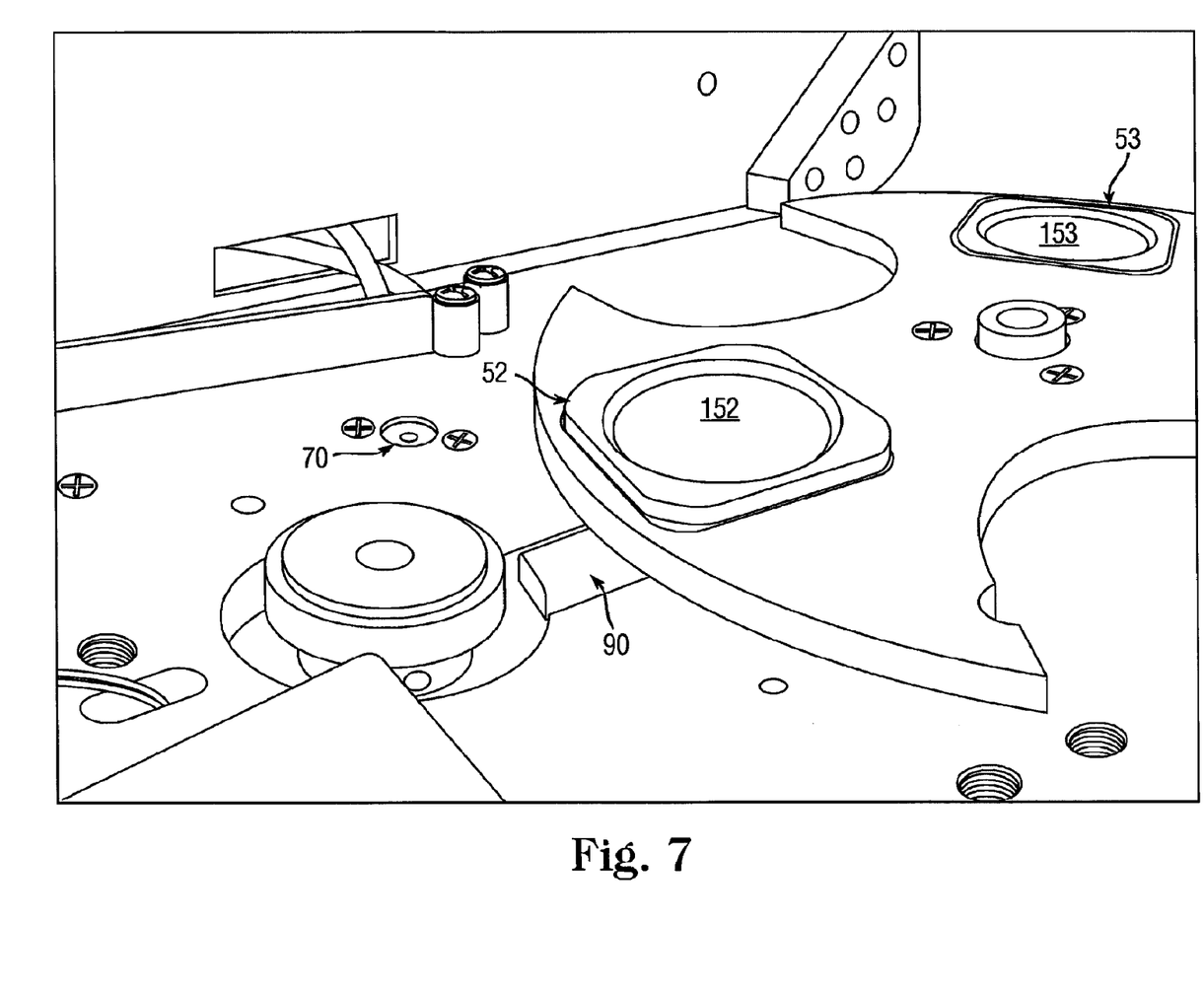
FIG. 7 is a close-up side perspective illustration of one of two floating calibration standards 152, 153. One calibration standard 152 is used for the baseline measurement and the other 153 can be used as a wavelength alignment standard to check the instruments wavelength and/or absorbance calibration. The use of the carousel 50 to revolve both calibration standards 152, 153 in the same sample plane as the sample cup, all seated in the cup carousel 50 of FIGS. 4-5 is a novel feature.

Referring now to FIG. 7, one of the two floating calibration standards 52 is shown in the carousel 20 of FIGS. 3-6. The calibration standards 52, 53 are made to float so that when they are in scan position an underlying magnetic or gravity fed pusher bar 90 (seen beneath) pushes them into direct facing contact with the monochromator scan window, thereby eliminating tolerances. Indeed, pusher bar 90 does this same thing with sample cups 4, which are likewise floating within U-shaped notches. This construct ensures more consistent and accurate scans both of calibration standards 52, 53 and sample cups 4. The pusher 90 is an offset weight hanging at the end of a pivoting arm. The offset bar of pusher 90 makes contact with the selected calibration standard 52, 53 or sample cup 4 to cause the desired force to act on them, thereby keeping them biased flatly against the scan window of the instrument.

Figure 8:
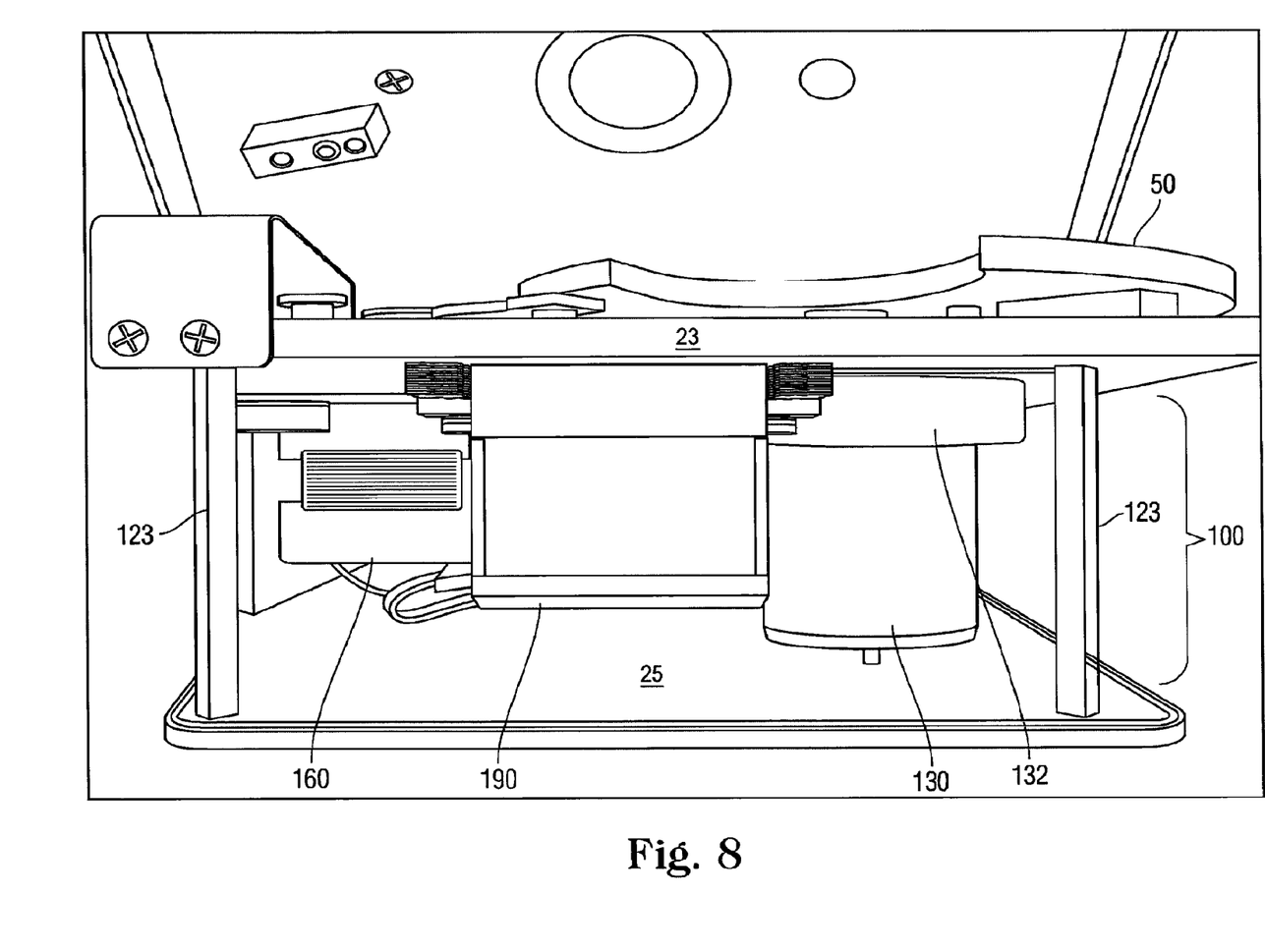
FIG. 8 is an open-top illustration of the electronics assembly 100 for the disc feeder/conveyor mechanism 20 of the present invention.
Figure 9:
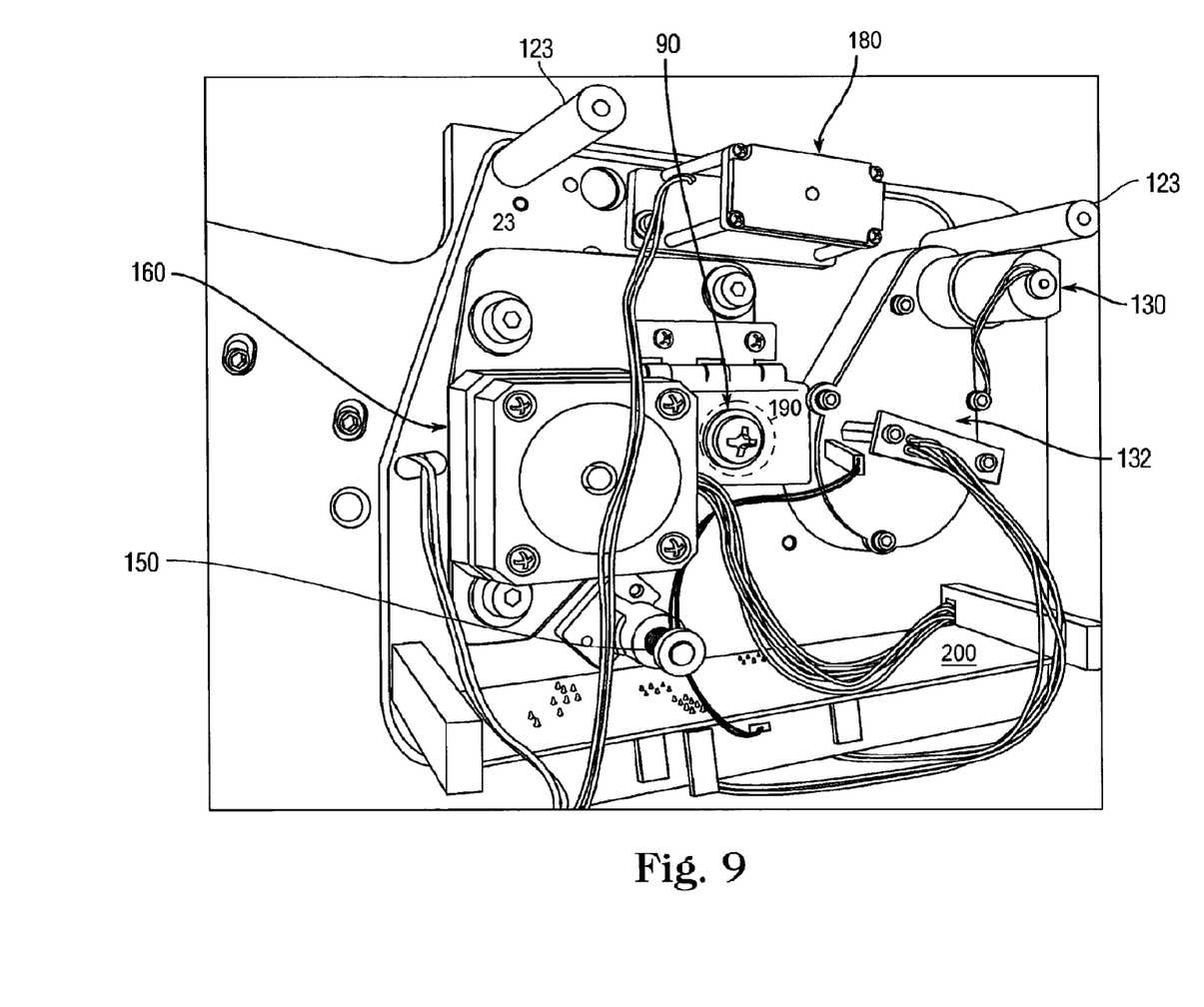
FIG. 9 is a close-up illustration of the electronics assembly 100 for the disc feeder/conveyor mechanism 20 of the present invention.

FIG. 8 is an open-top illustration of the electronics assembly 100 for the disc feeder/conveyor mechanism 20 of the present invention, and FIG. 9 is a close-up illustration of the electronics assembly 100. With collective reference to FIGS. 8 and 9, a cover plate 25 is suspended above the hinged plate 23 on support pylons 123, and a cover 125 (removed in these FIGS.) encloses the foregoing. This provides protective clearance for mounting an electronic circuit board 200, as well as a first servo-motor 130 and reduction gear 132 for incremental rotation of the carousel 20, and a second rotary servo motor 160 for pivoting operation of the gate 80. As seen in FIG. 9 the weighted pusher bar 90 is attached to a hinge outside inner plate 23 and protrudes forward through an aperture in the plate 23 to urge the selected calibration standard 52, 53 or sample cup 4 against the scan window of the instrument. A magnetic solenoid 150 drives the detent post 70. A servo 180 actuates the servo-controlled gate 80 provided at the mouth of infeed track 22 to selectively admit sample cups 4 into the carousel 20 by rotating out of the way.

The offset bar of pusher 90 is equipped with an embedded RFID reader/writer 190 (dotted lines) that makes close contact with the selected sample cup 4 to scan and write to RFID tags attached to the disc-shaped sample cups 4 seated in the carousel 50. The RFID reader/writer 190 is preferably a read/write head (pickup coil) attached remotely from the electronics, integral to the pusher bar 90 that is actually touching the sample cup while it is in the scan position to read and write to the RFID tags of sample cups 4 while at the instrument. This way, as the pusher bar 90 pushes the sample cups the reader/writer head 190 contacts the RFID tag directly. As stated above this second RFID reader/writer 190 pickup coil built into the pusher bar 90 is connected to RFID reader/writer electronics on circuit board 200, and the resulting functionality is essential to the track-and-trace abilities of the present system. Given that each sample cup in the carousel has a label with a unique sample number, type and other known information from the desktop reader/writer (FIG. 2, ref 32), this second local RFID reader/writer 190 (coil pickup in pusher bar 90) and associated electronics on circuit board 200 automatically reads the initially-stored data and verifies the proper sample cup 4. It also tells the controller 5 which calibration to use when predicting the constituent values etc. This eliminates the risk of operator error in loading the wrong sample cups. Also, when the instrument completes its sample scan, the scan information itself may be written directly to the sample cup RFID tag including reflection/transmission characteristics, predicted constituent values etc.

It should now be apparent that the above-described system is a more efficient and less error-prone feeder/conveyor for sample cups or other disc-shaped objects that allow a human operator to prepare sample cups, scan them, and track the entire process quickly and efficiently on an as-needed basis. This helps to ensure that samples are tested as soon as possible after being removed from the line, then ejected, from the analyzer back onto a return queue on the feeder/conveyor for prompt disposition.

Although described herein with reference to a process of feeding sample cups 4 into a spectrum analyzer, it should be understood that the inventive device 2 may be used in any industrial, agricultural, or commercial process requiring the queued advancement of disc-like objects from one area to another with minimal electrical output and with the ability to gate said objects for optimal spacing thereof.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

STATEMENT OF INDUSTRIAL APPLICABILITY

There are numerous industrial applications that require the linear transfer of small disc-shaped objects along process lines, batch operations or product storage locations for quality control, testing, packaging, labeling, surface treatment, painting/coating, etc. This is particularly true for commercial grain analyzers which use disc-shaped sample cups that are hand-loaded into the grain analyzer individually. Despite attempts at automating the process, it has proved difficult to feed disc-shaped objects into a precise position at finely-timed intervals. There would be great industrial applicability in a disc feeder/conveyor that can be readily interfaced to a conventional grain analyzer or other device to queue sample cups and transfer them on-demand immediately into a grain analyzer without delay, so that testing occurs as soon as possible after the sample is loaded into the sample cup. The foregoing would allow a human operator to fill a plurality of sample cups with materials to be analyzed, load those sample cups into a queue on the feeder/conveyor, the feeder/conveyor thereupon automating the infeed of the queued sample cups into an analyzer on an as-needed basis so that samples are tested as soon as possible after being removed from the line. Also, sample cups can be ejected from the analyzer back onto a return queue on the feeder/conveyor for prompt disposition.

We claim:

1. A feeding mechanism for indexing sample cups at a scanning window of a monochromator, comprising: a sample cup queueing mechanism configured for attachment to said monochromator, said sample cup queuing mechanism further comprising, an infeed track acutely-angled downward from horizontal toward a distal infeed end for gravity-feeding a plurality of said sample cups toward said infeed end, an outfeed track acutely-angled downward from horizontal away from a distal outfeed end for gravity-feeding the plurality of said sample cups away from said outfeed end, whereby said infeed track and said outfeed track converge radially toward a circle and the distal infeed end of said infeed track and the distal outfeed end of the outfeed track terminates at two points angularly offset about said circle and an upright wheel rotatable about said circle, said upright wheel comprising a rotatable disc defined by a plurality of radially-spaced peripheral recesses, each of said plurality of peripheral recesses being configured to seat one of said sample cups, whereby said upright wheel is configured to convey the sample cup seated in one of said plurality of radially-spaced recesses from the distal infeed end of said infeed track about said circle to the distal outfeed end of said outfeed track; and a pusher configured for imparting a lateral pushing force to one of said sample cups while sealed in one of said radially-spaced recesses to press said sample cup flatly against the scanning window of said monochromator while still seated in said radially-spaced recess.

2. The feeding mechanism according to claim 1, further comprising a switchable gate proximate an end of said infeed track for gating sample cups into said upright wheel.

3. The feeding mechanism according to claim 1, further comprising a spinner wheel proximate said upright wheel for spinning said sample cups when seated in said radially-spaced recesses.

4. The feeding mechanism according to claim 1, further comprising a reject chute.

5. The feeding mechanism according to claim 4, further comprising a solenoid post proximate said upright wheel, outfeed track and reject chute for diverting said sample cups away from said outfeed track into said reject chute.

6. The feeding mechanism according to claim 1, wherein said sample cup queuing mechanism is pivotally-attached to said monochromator by hinges.

7. The feeding mechanism according to claim 1, wherein said infeed track has a first sensor for detecting when it is full of sample cups.

8. The feeding mechanism according to claim 7, wherein said infeed track has a second sensor for detecting when it is empty of sample cups.

9. The feeding mechanism according to claim 1, wherein said plurality of radially-spaced recesses all comprise semi-circular recesses.

10. The feeding mechanism according to claim 1, further comprising a first calibration standard seated in one of said radially-spaced recesses.

11. The feeding mechanism according to claim 10, further comprising a second calibration standard seated in another of said radially-spaced recesses.

12. The feeding mechanism according to claim 1, further comprising a first radio frequency identification (RFID) reader/writer external to said sample cup queuing mechanism.

13. The feeding mechanism according to claim 12, wherein said sample cup queuing mechanism comprises a second RFID reader/writer.

14. The feeding mechanism according to claim 1, wherein said upright wheel is servo-driven.

15. A feeding mechanism for indexing sample cups to an analyzer, comprising: a sample cup queuing mechanism configured for attachment to said analyzer, said sample cup queuing mechanism further comprising, an infeed track acutely-angled downward toward a distal infeed end for gravity-feeding a plurality of said sample cups toward said infeed end, an outfeed track acutely-angled downward from horizontal away from a distal outfeed end for gravity-feeding a plurality of said sample cups away from said outfeed end, whereby said infeed track and said out track converge radially toward a circle and the distal infeed end of said infeed track and the distal outfeed end of the outfeed track terminate at two points angularly offset about said circle; an upright wheel rotatable about said circle, said upright wheel comprising a disc defined by a plurality off radially-spaced recesses, each of said plurality of recesses being configured to seat one of said sample cups, whereby said upright wheel is configured to convey sample cups seated in said plurality of radially-spaced recesses from the distal infeed end of said infeed track about said circle to the distal outfeed end of said outfeed track, and a pusher configured for imparting a lateral pushing force to a disc-shaped sample cup while seated in one of said radially-spaced recesses to press said sample cup flatly against a monochromator while still seated in said radially-spaced recess.

16. The feeding mechanism according to claim 15, further comprising a switchable gate proximate an end of said infeed track for gating the sample cups-into said upright wheel.

17. The feeding mechanism according to claim 15, further comprising a first radio frequency identification (RFID) reader/writer external to said sample cup queuing mechanism.

18. The feeding mechanism according to claim 17, wherein said sample cup queuing mechanism comprises a second RFID reader/writer.

* * * * *